United States Patent Office 2,823,165
Patented Feb. 11, 1958

2,823,165
METHODS AND COMPOSITIONS FOR CONTROLLING ANIMAL PARASITES

Konrad Bernhauer and Wilhelm Friedrich, Aschaffenburg, Germany, assignors to Firma Aschaffenburger Zellstoffwerke Aktiengesellschaft, Redenfelden, Upper Bavaria, Germany No Drawing. Application December 17, 1953
Serial No. 398,854

Claims priority, application Germany December 20, 1952

3 Claims. (Cl. 167—81)

The present invention relates to a process of purifying concentrates containing vitamins of the $B_{12}$ group obtained from any suitable raw material, and more particularly making use of phenolic compounds.

The vitamins of the $B_{12}$ group are known to exist very widely in nature, mainly as products of microbial action, however they are always only found in extremely small amounts. The first process step to obtain the vitamins of the $B_{12}$ group from the various natural products is the production of concentrates. This task is accomplished for example in the manner that an aqueous extract is produced from the starting material, and this is treated with an absorbing agent such as activated carbon and the adsorbate is eluted with aqueous alcohol. After the concentrating of the eluate in vacuum to a small volume there is obtained a highly active concentrate of the vitamins of the $B_{12}$ group. The present invention refers to the further treatment of such concentrates.

Concentrates of this type can now be further worked up in various ways, for example the aqueous solution of the anti-anemia factor is extracted with phenol. According to a known process, the following method of treating is utilized: the vitamin $B_{12}$-containing solution at a pH value of 1.0 is extracted with an alkylated phenol, preferably o-amylphenol.

The further purification of this concentrate depends upon the transferring of the vitamin $B_{12}$ from the organic phase into the aqueous phase. This has been done either by the addition of a large amount of liquid of the type in which the vitamin $B_{12}$ is not soluble and at the same time is not miscible with water, i. e. ethyl ether, petroleum ether, chloroform, etc., or by steam distillation.

The above mentioned aqueous concentrates produceable by the concentration of eluates can also be worked up in this manner so that the vitamin $B_{12}$, after addition of an inorganic salt, especially ammonium sulfate, can be obtained by extraction with alcohol. It has been found, however, that the saturation of the concentrates of the vitamin $B_{12}$ group with inorganic salts such as ammonium sulfate results in that practically the entire vitamin $B_{12}$ activity is separated contained in the precipitate with or without the application of a filter aid. In any case, there is obtained an enriching of the vitamins of the $B_{12}$ group which further need a very basic purification which is based upon a systematic separation of impurities, before it is possible to obtain crystallization of the vitamins of the $B_{12}$ group.

All of these treatments have various deficiencies, which are either completely eliminated or are at least minimized by the present invention.

It is therefore an object of the present invention to provide an improved process of treating concentrates of vitamin $B_{12}$.

It is a further object of the present invention to provide a process of extracting the vitamins of the $B_{12}$ group from either a dry concentrate or an aqueous concentrate containing the vitamins, such concentrate being obtained in the usual manner from a raw product containing the $B_{12}$ group vitamins, i. e. liver extract or *Streptomyces griseus*.

It is still another object of the present invention to provide a process of transferring the vitamins of the $B_{12}$ group, obtained in an organic phase from the dry or aqueous vitamin $B_{12}$ concentrate which in turn has been obtained from a raw product, into an aqueous phase.

It is another object of the present invention to provide a process of precipitating the vitamins of the $B_{12}$ group from the aqueous phase.

Other objects and advantages of the present invention will be apparent from a further reading of the specification and of the appended claims.

With the above objects in view, the process of treating a solid dry concentrate or an aqueous concentrate containing the vitamins of the $B_{12}$ group and obtained in the customary manner, mainly comprises the steps of treating a concentrate containing vitamins of the $B_{12}$ group with an organic solvent mixture comprising a phenolic substance dissolved in a liquid organic solvent in which the vitamins of the $B_{12}$ group are insoluble, whereby the vitamins of the $B_{12}$ group are dissolved in the solvent mixture, and recovering the thus obtained organic solution of the vitamins of the $B_{12}$ group.

According to a preferred embodiment of the present invention, an aqueous concentrate is treated with a halogenated phenol dissolved in a hydrocarbon, a halogenated hydrocarbon or carbon disulfide for the extraction of the vitamin $B_{12}$ group. The dry vitamin $B_{12}$ concentrate may be treated with any phenol dissolved in a solvent therefor, which solvent is not of itself a solvent for the vitamins of the $B_{12}$ group, i. e. a hydrocarbon, a halogenated hydrocarbon or carbon disulfide. It is to be understood that mixtures of such phenols and/or mixtures of the solvent therefor may be used instead of just the individual substances.

According to another preferred embodiment of the present invention, the halogenated phenols which are utilized with a hydrocarbon, halogenated hydrocarbon or carbon disufide solvent therefor, for the extraction of the vitamins of the $B_{12}$ group, particularly from an aqueous concentrate, contain the halogen group or groups preferably in the meta, and most preferably in the para position.

The process of the present invention may be carried out either on the countercurrent principle or by extraction with fractions.

The above described treatment of the dry or aqueous concentrate containing the vitamin $B_{12}$ group results in an organic solution containing these vitamins. The present invention then contemplates the removal of the vitamins of the $B_{12}$ group from this organic phase and this is preferably accomplished by adding a small amount of an oxygen-containing polar organic substance to the organic solution, whereby the solubility of the vitamins of the $B_{12}$ group in the organic medium is either partially, and in fact generally completely, removed. The oxygen-containing polar substance which is utilized may either be of the type in which the vitamins of the $B_{12}$ group are soluble i. e. an alcohol or the like, or a substance in which the vitamins of the $B_{12}$ group are not soluble, i. e. a ketone, ether, ester or the like. In any case, after the addition of the oxygen-containing polar organic substance to the organic phase, the vitamins of the $B_{12}$ group may be extracted from the organic phase by means of water. This may be done either by adding the water directly to the mixture or by first isolating the vitamins of the $B_{12}$ group, precipitated from the organic phase by an oxygen-containing polar organic substance in which the vitamins of the $B_{12}$ group are not soluble, and then treating with water.

The term "phenolic substance" as used throughout the specification and claims is meant to include phenol, alkyl, aryl and other derivatives thereof and more particularly the halogenated phenols. As shall be more clearly explained, derivatives having a substituent in the ortho position, particularly where the substituent is of large size, are not desirable and are therefore not meant to be included within the term "phenolic substances." The term "solvent agent" as used throughout the specification and claims is meant to include those liquid organic substances, namely hydrocarbons, halogenated hydrocarbons and carbon disulfide in which the phenolic substance is soluble but in which the vitamins of the $B_{12}$ group are insoluble. The term "solvent mixture" is meant to comprehend a mixture of such solvent agents and phenolic substance in which the vitamins of the $B_{12}$ group are soluble. The term "concentrate," unless specifically modified, is meant to include either a dry concentrate or an aqueous concentrate obtained in the usual manner from a raw product containing the vitamins of the $B_{12}$ group, i. e. liver extract.

Contrary to the prior known processes, the present invention comprises:

A. The extraction of the vitamins of the $B_{12}$ group from an aqueous concentrate with halogenated phenols dissolved in liquid hydrocarbons, halogenated hydrocarbons or in carbon disulfide;

B. The extraction of the dry powdery concentrate which contains the vitamins of the $B_{12}$ group with a phenol-containing solvent mixture;

C. The transfer of the $B_{12}$ vitamins from the phenol-containing organic phase into an aqueous phase; and D. The precipitation of the vitamins of the $B_{12}$ group from the aqueous solution by small amounts of suitable phenols.

The individual process steps of the present invention will be more fully discussed further in the specification.

It has been found that the above mentioned proceeding according to the known processes for the extraction of the vitamins of the $B_{12}$ group from an aqueous concentrate containing impurities can be considerably improved if there is used halogenated phenols dissolved in certain solvents which are not very miscible with water, i. e. hydrocarbons or halogenated hydrocarbons or carbon disulfide, this serving to extract the $B_{12}$ vitamins from the aqueous concentrate. The solvent to be suitable should be such liquid which can suitably dissolve the halogenated phenols. The very surprising and important discovery of the superiority of the halogenated phenols over non-halogenated phenols in treating aqueous concentrates may be seen from the following table, the best results being obtained if the halogenated phenols has the halogen situated in meta or para position, i. e. m-chorophenol or p-chlorophenol.

Although the scope of the present invention is not meant to be limited thereby, theoretical discussion will be given throughout in the hope that it will help others to better understand the process of the invention.

TABLE 1

| Run No. | Phenol derivative | Position of the Halogens | Position of the Methyls | Phenol content in trichloroethylene in which the distribution coefficient for $B_{12}$ is about 1 | | | | | |
|---|---|---|---|---|---|---|---|---|---|
| | | | | in Mol/Ltr | | | In percent | | |
| | | | | Volume | Proportion | Aqueous/organic phase | Volume | Proportion | Aqueous/organic phase |
| | | | | 1:1 | 5:1 | 10:1 | 1:1 | 5:1 | 10:1 |
| 1 | phenol | | | 0.95 | 2.05 | 3.3 | 8.93 | 19.3 | 31.0 |
| 2 | o-chlorophenol | ortho | | 2.24 | | | 28.8 | | |
| 3 | m-chlorophenol | meta | | 0.42 | 0.6 | 0.76 | 5.4 | 7.7 | 9.8 |
| 4 | p-chlorophenol | para | | 0.6 | 0.8 | 1.12 | 7.7 | 10.3 | 14.4 |
| 5 | 2,5-dichlorophenol | ortho, meta | | 1.67 | | | 27.2 | | |
| 6 | 2,6-dichlorophenol | ortho, ortho | | in saturated solution no extractability of vitamin $B_{12}$ | | | | | |
| 7 | 2,4-dichlorophenol | ortho, para | | 1.76 | | | 27.5 | | |
| 8 | 2,4,6-trichlorophenol | ortho, ortho, para | | in saturated solution no extractability of vitamin $B_{12}$ | | | | | |
| 9 | 2,4,6-tribromophenol | ortho, ortho, para | | in saturated solution no extractability of vitamin $B_{12}$ | | | | | |
| 10 | o-cresol | | ortho | 1.56 | | | 16.8 | | |
| 11 | m-cresol | | meta | 0.94 | | | 10.1 | | |
| 12 | p-cresol | | para | 0.86 | | | 9.3 | | |
| 13 | 6-chloro-3-cresol | para | meta | 0.64 | 0.64 | 0.64 | 9.1 | 9.1 | 9.1 |
| 14 | 6-chloro-2-cresol | meta | ortho | in saturated solution no extractability of vitamin $B_{12}$ | | | | | |
| 15 | 5-chloro-2-cresol | para | ortho | 1.02 | | | 14.6 | | |

From Table 1 it may be seen that in the ortho position, mono-halogenated phenols have a weak dissolving ability, in ortho position di-halogenated phenols have no dissolving ability for vitamins of the $B_{12}$ group; further, that in para position halogenated phenols in general have a better dissolving ability for vitamins of the $B_{12}$ group than non-halogenated phenols; as well as that a halogen in meta position very greatly increases the dissolving ability of the phenol for the vitamins of the $B_{12}$ group. Halogenating of cresol in general considerably increases the dissolving ability for vitamins of the $B_{12}$ group, above all in considering the molar concentration; an exception occurs with 6-chloro-2-cresol, which has no dissolving ability for the vitamins of the $B_{12}$ group. This pertains only to solutions of phenols in solvents mentioned above but not to phenols themselves.

The superiority of the halogenated phenols when extracting from an aqueous concentrate, particularly as compared to phenol, is especially apparent upon extraction with smal volumes of the organic phase. It is thus necessary, for example by an extraction with ⅕ volume of extracting agents, i. e. with trichloro-ethylene, plus a phenolic substance, to utilize 19.3% phenol but only 9.1% 6-chloro-3-cresol, 10.3% p-chlorophenol or 7.7% m-chlorophenol, if the distribution coefficient for the vitamins of the $B_{12}$ group has a value of 1.

A still greater superiority of the halogenated phenol, as compared for example to phenol, in extracting from aqueous concentrates, arises by the extraction with ⅒ volume of extracting agent. It has been noticed that for example only 14.4% of p-chlorophenol in trichloro-ethylene is necessary as compared to more than double the amount of phenol (31.0%). If the calculation is made in relation to the molar concentration, it is shown, as in Table 1, that the superiority of the mentioned halogenated phenol is still more clearly apparent.

The rapid increase in the need for the phenol with the lowering of the volume of extracting agents may be traced back to the relatively high solubility of the phenol in water. The phenol divided itself between the water and the phenol carrier, i. e. the trichloroethylene, and the higher the relative volume of the aqueous phase, the more phenol is lost during the extraction. The phenomenon occurs with halogenated phenols only to a very slight extent, which is traceable back to the slight solubility of the substances in water. Thus, the need for 6-chloro-3-cresol is practically not increased at all with lowering of the volume of extracting agents, as may be seen in Table 1.

The concentrations of halogenated phenol in the organic phase to be used in this extraction process are evident from the above table, though the amounts are given as exemplary only.

The extraction of the aqueous phase with the above named solvent mixtures can be carried out in separatory funnels or, on the countercurrent principle, in batteries of separatory funnels, or in solvent-centrifugal-extractors.

In the following description of the present invention for the purification of concentrates of the vitamin $B_{12}$ group which results in a considerable improvement of the known products, a dry product serves as starting material, the dry product containing vitamins of the $B_{12}$ group and are obtained by one of the following two methods:

(1) A solution reduced to a small volume and containing the $B_{12}$ vitamins is saturated i. e. with ammonium sulfate and at the same time extracted with a higher alcohol, i. e. n-butanol, amyl-alcohol or benzylalcohol. The extract is evaporated to dryness under vacuum and the dry product is pulverized.

(2) The same type of solution as in 1 above is likewise saturated with ammonium sulfate. The thus resulting precipitate which contains the vitamins of the $B_{12}$ group is, as such, or after addition of a filter aid such as diatomaceous earth, separated and either immediately or in vacuum dried or by mixing with roasted sodium sulphate or gypsum or the like dehydrated and the dry product pulverized.

The process according to the present invention thus also concerns the extraction of a dry product containing vitamins of the $B_{12}$ group. The dried powder containing vitamin $B_{12}$ obtained according to one or both of the described methods is extracted with a solvent mixture. This consists of phenol or a halogenated phenol and a suitable solvent therefor which is not miscible with water and in which alone the vitamins of the $B_{12}$ group cannot be dissolved, for example a low hydrocarbon or a low halogenated hydrocarbon or carbon disulfide. Solvents of this type serve only as phenol carrier and are so designated in the remainder of the specification. By this extraction the vitamins of the $B_{12}$ group go into solution while the entire preponderant amount of the inorganic salt as well as a considerable amount of organic impurities remain behind undissolved.

The process can, however, also be carried out in such manner that the extraction of the dry powder containing the vitamins of the $B_{12}$ group is by fractional percolation with a series of solvents and/or solvent mixtures. For this purpose the dry material is stirred with acetone and in mushy slimy-like state it is filled in the percolator. It is then, if necessary under pressure, or at increased temperature thoroughly washed with acetone whereby first yellow-colored impurities go into solution. It is then washed with one of the above named phenol carriers or solvent agents, first without the addition of a phenol (or with another suitable solvent in which the vitamins of the $B_{12}$ group are not soluble) whereby further impurities are dissolved.

The resulting percolate up to this point is practically free of vitamins of the $B_{12}$ group and can therefore be disregarded. Finally, the product is percolated with a mixture of a phenol carrier with a phenol (a solvent mixture). The content in this stage of the applied percolating liquid in phenolic substances should be more than 5%. Although, for example trichloroethylene has a pronounced ability for extracting the vitamins of the $B_{12}$ group from water, only after the addition of about 10–15% phenol, it is possible according to the present invention, by the use of a solid extraction material (a solid concentrate) to obtain an excellent yield with only a 5–10% phenol solution. Already with a content of 5% phenol or a halogenated phenol, i. e. in trichloroethylene, there may be seen a weak dissolving action with respect to the vitamins of the $B_{12}$ group, while it is practically impossible with a similar mixture to extract the vitamins of the $B_{12}$ group from an aqueous solution.

With the described process there is the possibility on the one hand by the pre-percolation by means of solvents in which the $B_{12}$ vitamins are not soluble, to remove considerable amounts of impurities, and on the other hand there remains a great deal of impurities in the percolator after the main percolation. The resulting percolate which is ready for further treatment and which contains the vitamins of the $B_{12}$ group has a deep red color and can with advantage be further treated to obtain crystals of the $B_{12}$ vitamin group.

The process of the present invention has the advantage that it is possible to utilize a relatively low amount of solvent and a very much reduced amount of phenolic substances. This results on the one hand in the advantage that it is possible to work in small preparation vessels, which, therefore, results in a greater production capacity, and on the other hand in that the preparation is facilitated since substantially smaller amounts of phenols need to be removed in the further running of the treatment. It is self-evident that the working with smaller amounts of solvents also results in a considerable economic improvement.

The application of dry powders containing the vitamins of the $B_{12}$ group makes possible the use of percolators which are insofar advantageous that on the one hand a removal of impurities through fractional application of various solvents is easily possible and on the other hand the main portion of impurities remains behind undissolved.

Also, as compared to the known methods of extracting dry powders containing vitamins of the $B_{12}$ group with other solvents such as alcohols, the process of the present invention has the advantage that a much purer extract or percolate by far is obtained, since solvents such as trichloroethylene, benzol and the like, do not at all, or only in small proportion are able to dissolve the impurities present, which are dissolved by alcohols. Thus, the present invention presents therefore a considerable advance.

It is necessary in order to remove the vitamins of the $B_{12}$ group from the organic phase and to carry it over into the aqueous phase, according to the prior processes, always to utilize large amounts of liquids, usually more than the volume of the organic phase. It has now been found that disadvantages of the hitherto utilized processes can be overcome by the process of the present invention. This is based on the surprising discovery that the vitamins of the $B_{12}$ group can quite generally be transferred from the phenol-containing solvent or solvent mixture by the addition of a small amount of certain oxygen-containing polar organic substances which displace the vitamins into the aqueous phase.

This will be illustrated by the following examples:

A concentrate is taken which is obtained from the running of a purification of the vitamins of the $B_{12}$ group from a natural substrate. If this concentrate is extracted by means of trichloroethylene plus p-chlorophenol, there is obtained for example 100 cc. of extract which besides various impurities consists of 20% p-chlorophenol in trichloroethylene with 7.5–10 mg. of vitamin $B_{12}$. To this extract is added 50 cc. of water. In the thus resulting two-phase system the vitamins of the $B_{12}$ group are found exclusively in the organic phase, while the aqueous phase is practically colorless and contains practically no vitamins of the $B_{12}$ group. This mixture is then mixed and shaken with one of the following substances in the designated amount, which is always calculated upon 100 cc. of the organic phase:

|  | cc. |
|---|---|
| Ethylacetate | 3.5 |
| Ethyl ether | 5.0 |
| Dioxane | 5.0 |
| Acetone | 5.0 |
| Methylethylketone | 6.0 |
| n-Butanol | 7.5 |
| Amylalcohol | 7.5 |
| Methanol | 15.0 |

In each case, the vitamins of the $B_{12}$ group go over very suddenly and practically quantitatively into the aqueous phase. The action is very revealing and surprising. Since the remaining colored impurities in the organic phase remain to a considerable degree, the aqueous solution has an intensive and pure red color.

It is self-evident that the figures given above with respect to the amounts of the oxygen-containing substances are only guiding figures and may be very greatly varied. The addition of a polar oxygen-containing organic substance to the two-phase system of water/hydrocarbon plus phenolic substance shifts the distribution coefficient of the vitamins of the $B_{12}$ group in favor of the water; in other words the addition increases the solubility of the vitamins of the $B_{12}$ group in water. According to whether more or less oxygen-containing polar substance is added, the distribution coefficient is shifted to a greater or lesser extent, which again has the result that the connected extraction of the vitamins of the $B_{12}$ group with water can be carried out with more or less frequent extractions by shaking.

The importance of the process of the present invention for the purification of vitamins of the $B_{12}$ group is particularly evident if the present invention is compared with the known methods of proceeding. An analogous effect with regard to the transferring of the vitamins of the $B_{12}$ group from the organic into the aqueous phase can only occur according to the known processes first by the addition of an equal volume of trichloroethylene, chloroform, hydrocarbon, carbon disulfide, or a somewhat lesser volume of benzol and the like, in other words in the above example only by the addition of at least 75–100 cc. of solvent. The difference is therefore extraordinarily apparent. While with the known processes the utilized solvent only has the function of diluting the phenol-containing organic phase to such extent that the phenol loses its property of holding the vitamins of the $B_{12}$ in the organic phase, according to the present invention there is no diluting action but the addition of the oxygen-containing polar agents plays a decided role, giving a completely new effect, which results in a considerable saving of organic solvents.

The amounts given in the above table of polar oxygen-containing substances causes, in the absence of water, already the formation of a floculation containing the vitamins of the $B_{12}$ group in the phenol- or phenol-derivative containing solvents. A further addition of extracting agent can serve for complete precipitation of the vitamins of the $B_{12}$ group. This occurs for ketones, esters, ethers, and the like; in other words for each polar substance in which the vitamins of the $B_{12}$ group are not soluble. Alcohols produce in the above given amounts also a floculation, which however is not quantitative. If by the addition of a suitable oxygen-containing polar substance to a mixture of phenol- or a phenol-derivative with a suitable solvent containing the vitamins of the $B_{12}$ group a total or only partial floculation of the vitamins of the $B_{12}$ group occurs, this is unimportant. In each case according to the process of the present invention, the solubility of the vitamins of the $B_{12}$ group in the concerned medium is lowered to such extent that without further treatment the vitamins can be extracted with water.

The theoretical explanation of the action of the above named oxygen-containing polar substances is that these substances have the ability of forming a solvate or complex with the phenol. Such solvate or complex of the phenol molecule loaded with the polar molecule no longer has the property of serving as carrier for the vitamins of the $B_{12}$ group. As a result of this, the phenol or phenol derivative no longer has the ability of causing polar mediums which are not solvents for the vitamins of the $B_{12}$ group to have a solution effect for these vitamins. Neither do phenols have the capacity of increasing the solubility for vitamins of the $B_{12}$ group in polar mediums which are capable of dissolving these vitamins, in the event that the molecular ratio of phenol/polar medium is less than 1. Polar media which contain abnormally high additions of phenol have the capacity of dissolving the vitamins of the $B_{12}$ group and to extract the same from water. This observation is in good agreement with the ascertainment that for example very small amounts of methanol (i. e. 0.5%) in a solution of phenol and chloroform considerably alter the absorption spectrum of the phenol. Even 2.5% of methanol in chloroform acts so that the absorption spectrum of the phenol takes up the same design as pure methanol. This means, therefore, that already with this slight amount of methanol a complete solvating of the phenol takes place.

It has now been found that the vitamins of the $B_{12}$ group, according to the present invention, with very slight amounts of various phenolic substances can be caused to precipitate from the aqueous phase. The hitherto needed concentrations of suitable phenols in the very dilute aqueous solution of the $B_{12}$ group vitamins generally lay under the saturation concentration of the particular phenol in water. Only in very impure aqueous solutions, such as raw concentrates, are somewhat higher concentrations of phenolic substances necessary for the quantitative precipitation of the vitamins of the $B_{12}$ group.

This precipitation is tied up with a substantial purification of the vitamins of the $B_{12}$ group. Substances which with phenols give no precipitation are practically completely separated. To this group belong above all the brown impurities which for example are present in the extracts of digested sludge.

The novel and truly unexpected discovery that the vitamins of the $B_{12}$ group can be precipitated from aqueous solutions by phenols, which have been previously confirmed as excellent solvents for these vitamins, is illustrated by the following:

It is known that phenols with oxygen compounds such as ethers, aldehydes, ketones, esters, acids, as well as with amines and acid amides form complexes which are often very difficultly soluble. (P. Pfeiffer, "Organische Molekülverbindungen" in "Stereochemie," Leipzig und Wein 1932.) By the addition of a slight amount of a suitable phenol to the aqueous solution of the vitamins of the $B_{12}$ group, the observed precipitate is probably such a type of complex. The vitamin $B_{12}$ molecule contains sufficient oxygen and nitrogen atoms to be able to serve as electron donator for the formation of such a type of complex. The complexes formed with the suitable phenolic substances of the vitamins of the $B_{12}$ group which without exception are difficulty soluble in water dissolve excellently in an excess of the particular phenolic substance. They go therefore into the liquid phenol-rich phase or in the solid phenol phase if an excess of phenolic substance is utilized. If the phenolic substance is utilized not as such, but as a mixture with a hydrocarbon or with carbon disulfide, the vitamins of the $B_{12}$ group as phenolic substance complexes go into the organic phase.

In the case of the precipitation with phenol as well as the extraction with a phenol mixture from the aqueous solution, it is not the free vitamins of the $B_{12}$ group which are dealt with but their complex compounds with phenols which are very well dissolved in the corresponding phenols, and the phenol-rich phase of the phenol-water-mixture, as well as in the phenolic substance-hydrocarbon-mixture and in the phenolic substance-carbon disulfide-mixture, but not however in water or in the poor in phenol, phenolic substance-water-phase.

For the formation of complexes of phenols with the vitamins of the $B_{12}$ group, the following conditions are valid, which can be determined from the figures of Table 2 below considering also the previously given information:

(1) The complex formation occurs under conditions such that a reaction between the two partners is possible, for example in aqueous solution of the two constituents, or between the vitamin $B_{12}$ group being in solution and the solid phenolic substance or molten phenolic substance or a solution of the phenol, or between vitamins of the $B_{12}$ group in solid state and molten or dissolved phenolic substances. For practical purposes, it is necessary that the complex formation is favored to occur if the concerned phenol is present in molten state. Solid phenols react, therefore, in general favored by temperatures which lie at or higher than their melting point. Many phenols form however complexes also in the solid state. The following observations are based upon the reactions of the phenols with aqueous solutions of vitamins of the $B_{12}$ group at customary or higher temperatures. For practical purposes it is very valuable that the complex formation is practically quantitative and in the least concentration of the vitamins of the $B_{12}$ group and that in this manner an isolation of the vitamins of the $B_{12}$ group is possible from very dilute solutions.

(2) For the formation of the complex it is necessary that the phenolic compound contains a free hydroxyl group. Etherated or esterified phenols are therefore unsuitable.

(3) Phenolic substances with more than one hydroxyl group, such as di- or tri-hydroxy-benzols, are not suitable for complex formation.

(4) Phenolic compounds with oxygen containing substituents such as nitro, carbinol, and carbonyl groups and the like, and also such containing amino groups have no or only an extremely weak ability to form complexes with the vitamins of the $B_{12}$ group.

(5) Besides phenol itself, the numerous derivatives of the monohydroxybenzols as well as the naphthols are suitable for the formation of complexes. This ability is influenced positively or negatively by the type and position of the particular substitution to a regular extent, that is increased or decreased, and in many cases also completely eliminated, as may be seen from the following:

*a.* Non-oxygen-containing, negatively-charged substituents, such as halogens fundamentally increase the binding ability of the phenol if they are in meta or para position. The meta position increases the binding ability more than does the para position.

*b.* Substituents such as alkyl groups have practically no influence if they are in the meta or para position.

*c.* All substituents in the ortho position weaken the complex forming ability of the phenol.

*d.* By more than one substituent the type and position thereof have an even greater effect. While the placing in the meta and para positions also by more negatively charged radicals in general has a strengthening action, the occupying of the two ortho positions has a completely undesirable influence on the complex forming ability. Thus phenolic substances in which the two ortho positions are substituted by alkyl or halogen groups do not form any complex in the cold with the vitamins of the $B_{12}$ group (in aqueous solution). In this case however the molecular size of the substituents has an influence since two chlorines in the ortho position in a substituted phenol still form in molten state, that is while hot, a complex by shaking with the aqueous solution of the vitamin $B_{12}$ group, but not however with the analagous dibromo compounds.

The following examples serve to clarify these observations and conditions:

The fact that ortho substituted phenols have less of a capability of forming complexes than the non-ortho substituted may be explained only on the basis of steric hindrance. The larger the ortho placed substituent, the slower reacting of the phenol hydroxyl group. The larger bromine atom hinders the reaction ability of the phenol hydroxyl group to a greater extent than does the chlorine atom. Accordingly, 2,4,6-tribromophenol is no longer able, and in fact also not even in molten state, to bind the vitamins of the $B_{12}$ group. The phenol which is chlorinated in the same manner however still has the ability of forming complexes, but only in the molten state. These observations correspond with findings which were made in completely different relation. Thus, for example, 2,6-di-tertiarybutyl-4-methylphenol, with most phenol reagents no longer shows the typical phenol reactions. The inability of reaction of this compound can be traced back to the steric hindrance of the phenol hydroxyl group by the ortho position-found two tertiary butyl groups (N. C. K. Jones et al., Ind. Eng. Chem. 44, 2721 (1952)).

For practical carrying out of the precipitation of the vitamins of the $B_{12}$ group, the corresponding amount of phenolic substances is stirred in the aqueous solution of the vitamin and the stirring is continued for some time. With solid phenols, a warming of the mixture is for the most part necessary to a temperature at which the phenol is molten. According to the solubility of the particular phenols in water there is formed either immediately, or after several hours, a turbidity. After standing for a short time the complex compound of the vitamins of the $B_{12}$ group deposits a red oily or solid precipitate on the bottom which may subsequently be separated.

To facilitate the separation of this precipitate from the aqueous liquid, preferably a porous carrier such as diatomaceous earth or cellulose powder, is stirred together with the precipitate subsequently resulting in a quick clearing of the liquid.

The obtained combined effect of the simultaneous application of phenolic substance and porous carrier is arousing the likelihood of adsorption of the vitamins of the $B_{12}$ group on the carrier, which after the precipitation is equally red colored. It has however been shown that these carriers do not act as adsorbents. In tests carried out without carrier or with enormously high amounts of carrier, pactically the same precipitating effect can be obtained, as is shown in Table 2.

TABLE 2

Precipitation of vitamins of the $B_{12}$ group from an aqueous solution with phenol by the application of a purified vitamin $B_{12}$ solution obtained out of digested sludge. Temperature about 20° C., pH 4.5. The numbers in the table give the vitamin $B_{12}$ content of the aqueous solution, determined by means of a Beckman spectrophotometer in gamma per cubic centimeter, after precipitation and filtration. Precipitation is with or without the application of diatomaceous earth with increasing amounts of phenol.

| Percent Diatomaceous earth | Percent Phenol | | | | | | |
|---|---|---|---|---|---|---|---|
| | 0 | 2 | 4 | 5 | 6 | 7 | 8 |
| 0 | 23.6 | 23.8 | 23.6 | 22.9 | 16.7 | 6.1 | 1.3 |
| 1 | 23.7 | 23.6 | 23.8 | 21.9 | 16.6 | 4.6 | |
| 2 | 24.0 | 23.7 | 23.4 | 23.4 | 16.5 | 5.2 | |
| 3 | 23.4 | 23.8 | 24.0 | 22.8 | 16.4 | 8.0 | |
| 4 | 23.8 | 23.6 | 23.5 | 22.9 | 16.4 | 6.1 | |

Thus, diatomaceous earth (or cellulose powder) plays practically only a role as filter aid. It suffices in most cases to utilize an addition of 0.5-2% as filter aid.

The data contained in Table 3 illustrates the precipitation ability of the vitamins of the $B_{12}$ group with various phenols. This table shows that between the several phenols great distinction are present which correspond with the observations made with respect to mixtures of the same phenols with hydrocarbons and contained in the previous example.

TABLE 3

Precipitation ability of the vitamins of the $B_{12}$ group from aqueous solution by various phenols utilizing a vitamin $B_{12}$ solution obtained out of digested sludge with a content of 30 gamma vitamin $B_{12}$ per each cc. with the addition of 1% diatomaceous earth as filter aid:

| No. | Phenolic substance | Percent content of phenolic substances in the solution, necessary for complete precipitation of $B_{12}$(A) | | Solubility of phenol substances in $H_2O$(B) | $C=\frac{100A}{B}$ |
|---|---|---|---|---|---|
| | | in the cold | in the hot (molten) | | |
| 1 | phenol | 8 | | 8.2 | 97.5 |
| 2 | o-chlorophenol | 2.2 | | 2.8 | 78.5 |
| 2a | o-bromophenol | 2.2 | | very slightly soluble | |
| 3 | m-chlorophenol | 1.6 | | 2.6 | 61.5 |
| 4 | p-chlorophenol | 2.0 | | 2.7 | 74.0 |
| 4a | p-bromophenol | 1.7 | | 1.42 | 120.0 |
| 5 | 2,5-dichlorophenol | about 1.0 | less than 1.0 | slightly soluble | |
| 6 | 2,6-dichlorophenol | no precipitation | more than 1.0 | | |
| 7 | 2,4-dichlorophenol | precipitation | less than 1.0 | 0.45 | |
| 8 | 2,4,6-trichlorophenol | no precipitation | about 2.5 | 0.08 | |
| 9 | 2,4,6-tribromophenol | do | no precipitation | | |
| 10 | o-cresol | 2.6 | | 2.6 | 100 |
| 11 | m-cresol | 2.4 | | 2.42 | 99.2 |
| 12 | p-cresol | 2.0 | | 2.29 | 87.3 |
| 13 | 6-chloro-3-cresol | 1.0 | less than 1.0 | insoluble | |
| 14 | 6-chloro-2-cresol | no precipitation | do | | |
| 15 | 4-chloro-2-cresol | precipitation | | | |
| 16 | 5-chloro-2-cresol | do | less than 1.0 | | |
| 17 | 2,5-dimethyl-1-oxybenzol | no precipitation | more than 1.0 | | |
| 18 | 3,5-dimethyl-1-oxybenzol | do | do | | |
| 19 | 3,4-dimethyl-1-oxybenzol | do | do | | |
| 20 | p-tertiary-amylphenol | do | much more than 1.0 | | |
| 21 | p-oxy-diphenyl | do | do | | |
| 22 | o-oxy-diphenyl | do | do | | |
| 23 | thymol | do | practically no precipitation | | |
| 24 | carvacrol | precipitation | precipitation | | |
| 25 | α-naphthol | no precipitation | about 2 | very slightly soluble | |
| 26 | β-naphthol | do | more than 2 | 0.075 | |

The fact that in order to completely precipitate the vitamin $B_{12}$ group, variable amounts of the various phenolic substances are necessary, is partially explained by the above given conditions and partially in that the individual phenolic substances have different solubilities in water. In general, the need of phenols is less if the phenol is more difficultly soluble in water. There is found namely between water and the vitamins of the $B_{12}$ group a competition for the phenolic substance, whereby an equilibrium is set up as to the distribution of the phenolic substances between the vitamins of the $B_{12}$ group and water, the ratio of the distribution being dependent upon the capacity of the phenols to combine with the two competing substances.

The figure B of Table 3 characterizes approximately the ability of the phenolic substances to bind water. The figure C tells to a certain degree if the particular phenolic substance can bind the vitamins of the $B_{12}$ group better or worse, compared to the water-binding ability. The lower the figure C, the better—compared with water—can the vitamins of the $B_{12}$ group be bound by the phenolic substance.

The above conditions apply also to the aqueous solutions of crystallized vitamins of the $B_{12}$ group, and not only for the above given vitamin $B_{12}$ concentrate. Very impure raw extracts need for complete precipitation of the vitamins of the $B_{12}$ group somewhat more phenols, some times as much as double the amount, as compared with the values in Table 3.

The precipitation of the vitamins of the $B_{12}$ group with the phenols can be carried out in a pH range of 1.0-8.5.

At pH values above 8.5, the precipitation ability is lowered. The precipitating capacity of the sediment and the clearing capacity of the liquid, particularly after the addition of diatomaceous earth or powdered cellulose, increase with lowered pH values.

The separation of the vitamin $B_{12}$ group-containing sediment can be either through filtration or by the aid of a centrifuge.

The recovery of the vitamins of the $B_{12}$ group from the separated and possibly diatomaceous earth—or powdered cellulose-containing or other filter aids-containing sediment can be carried out in the following ways:

(a) The sediment can be mixed, also in wet state, with a hydrocarbon or carbon disulfide to which additional amounts of a phenol have been added, for extraction purposes, whereby the vitamins of the $B_{12}$ group are transferred into the mixture of phenol plus hydrocarbon or carbon disulfide. In this case the complex remains unchanged.

(b) The sediment can be stirred with a water-soluble substance, in which, however, the vitamins of the $B_{12}$ group are not soluble, such as for example with a lower ketone, and then filtered off and dried. By this procedure, the complex is broken up and the phenol component removed. After mixing the thus obtained powders, for example with water, the vitamins of the $B_{12}$ group go immediately into solution.

(c) The sediment can be stirred with an alcohol and filtered. The vitamins of the $B_{12}$ group appear together with the phenols in the filtrate. In this case, the complex is likewise broken up.

In any method of proceeding according to a-c above, a further purification of the vitamins of the $B_{12}$ group occurs consisting of a removal of proteins, colored substances and the like.

The following examples are given as illustrative only of the process of the present invention, the scope of the present invention not however being limited to the specific examples given.

*Example 1*

100 cc. of a red-brown colored vitamin $B_{12}$ concentrate obtained out of digested sludge and which contains according to the microbiological test with *E.coli*-mutant 113-3, 30 gamma of vitamin $B_{12}$ per cc., in other words a total of 3 mg., is brought to a pH of 7.0 and is extracted with 20, 10 and 10 cc. of a 20% solution of p- chlorophenol in trichloroethylene. The dark red extract is purified and washed once with 10 cc. of a 5% sodium bicarbonate solution and subsequently three times, each time with 10 cc. of water. The presently obtained extract of 40 cc. can with advantage be utilized for further purification and obtaining of crystallized vitamin $B_{12}$.

*Example 2*

136 cc. of an aqueous vitamin $B_{12}$ concentrate obtained out of digested sludge and containing 40 gamma of vitamin $B_{12}$ per cc. is brought to a pH of 7.0 and mixed with 1.4 g. of diatomaceous earth and 78 g. of ammonium sulfate. After dissolving the ammonium sulfate, a red-like floccular sediment precipitates out and is filtered. The wet, red-colored filtered residue (about 8.3 g.) is by triturating with 7.6 g. of water-free sodium sulfate transformed into a dry powder. The thus obtained dry powder is subsequently finally pulverized in a mortar and mixed with 25 cc. of trichloroethylene. The thus obtained slurry is put in a percolator. As soon as the surface level of the liquid has almost reached the upper level, a mixture of trichloroethylene with 5% p-chlorophenol is introduced. This mixture extracts only insignificant amounts of the vitamins of the $B_{12}$ group as well as yellow-colored substances. Only after raising the p-chlorophenol concentration in the trichloroethylene to 10% is about 35 cc. of a dark red colored percolate obtained. The further percolation with the like solvent mixture yields an only weakly yellow-colored flow. The column is colored brown after the percolation and contains the main portion of impurities. The percolate containing the vitamins of the $B_{12}$ group serve for further purification of the vitamins of the $B_{12}$ group until their crystallization.

*Example 3*

50 cc. of concentrate obtained out of digested sludge containing the vitamins of the $B_{12}$ group in an amount of 40 gamma per cc. is mixed with 29 g. of ammonium sulfate and subsequently extracted four times, each time with 10 cc. of n-butanol. The butanol extract is evaporated to dryness in vacuum at a temperature of about 30–40° C. The obtained residue is extracted with 5 cc. of a mixture of 1 g. phenol and 4 cc. of trichloroethylene, the extract subsequently washed four times each with 1 cc. of water and the thus purified extracts are if necessary with advantage further worked up to crystallized vitamin $B_{12}$.

*Example 4*

50 cc. of the same vitamin $B_{12}$ concentrate as in Example 3 is stirred with 29 g. of ammonium sulfate and 0.5 g. of diatomaceous earth. The flocculated red sediment is filtered. This wet product of 3.0 g. quantity is mixed with 2.8 g. of water-free sodium sulfate and triturated to a powder. The dry powder obtained in this manner from the vitamin $B_{12}$ group concentrate is subsequently stirred with acetone and a percolator is filled therewith. After running through of the acetone there is an after-wash with 5 cc. of trichloroethylene and it is then percolated with 15 cc. of trichloroethylene containing 15% phenol. The remaining percolate material has a brown color and the total vitamin $B_{12}$ activity is found in the red colored percolate from which with advantage crystallized vitamin $B_{12}$ can be obtained.

*Example 5*

40 cc. of a solution which contains 2.9 mg. of the vitamins of the $B_{12}$ group along with various impurities in a solvent mixture consisting of 20% p-chlorophenol and trichloroethylene and which has been obtained by a purification process of the vitamins of the $B_{12}$ group out of digested sludge, and wherein the dry substance is about 1% vitamins of the $B_{12}$ group, is mixed with 2 cc. of n-butanol and shaken four times, each time with 10 cc. of water. The purified, intensively red-colored aqueous extract is washed twice each with 10 cc. of n-butanol, and three times each with 15 cc. of ethyl ether. There is thus obtained a pure red-colored aqueous solution which contains 2.8 mg. of vitamins of the $B_{12}$ group. The solid substance of this solution contains now the vitamins of the $B_{12}$ group in a concentration of about 6%.

*Example 6*

35 cc. of the same starting material as in Example 5 obtained from a vitamin $B_{12}$ concentrate, consisting of a mixture of 10% p-chlorophenol in trichloroethylene with a content of 5.2 mg. of vitamins of the $B_{12}$ group is mixed with 3.5 cc. of methylethyl ketone whereby a carmine red floccular sediment percipitates. This is separated, washed with trichloroethylene and subsequently dissolved in 5 cc. of water. The obtained solution can with advantage be utilized for the further purification and crystallization of the vitamins of the $B_{12}$ group.

*Example 7*

To 500 cc. of a purified aqueous solution at pH 3.5 containing 25 gamma per cc. of the vitamins of the $B_{12}$ group is added 11 g. of p-chlorophenol and 5 g. of diatomaceous earth. After 10 minutes of shaking there is obtained a floccular, easily separable sediment which is filtered with the help of a glass suction filter G3, subsequently stirred with 20 cc. of acetone, filtered, washed with acetone and freed of acetone in a vacuum dessicator. The red-colored powdered sediment is stirred with 20 cc. of water and filtered. The filtered residue is washed with a small amount of water. The vitamins of the $B_{12}$ group are now found quantitatively in the filtrate, whereby the concentration of the vitamins of the $B_{12}$ group in the aqueous solution to about 20 times, as well as a final substantial purification in a quick and careful manner, has occurred.

*Example 8*

To 200 cc. of a purified aqueous solution at pH 3.5 containing 40 gamma per cc. of vitamins of the $B_{12}$ group is mixed 16 g. of phenol and 2 g. of diatomaceous earth. After shaking for a short time the floccular red sediment is filtered, washed with 8% aqueous phenol solution, subsequently stirred several times each with 10 cc. of a mixture of 20 parts phenol and 80 parts trichloroethylene and filtered. The red-colored phenol-trichloroethylene-extract contains concentrated the vitamins of the $B_{12}$ group in practically quantitative yield in substantially pure state and can be further worked up in the usual manner.

*Example 9*

4.5 cc. of an eluate concentrate obtained out of digested sludge which contains 70 gamma per cc. of the vitamins of the $B_{12}$ group along with various impurities at pH 3.5 is shaken with 0.18 g. p-chlorophenol and 0.18 g. of diatomaceous earth for 10 minutes. Subsequently, the precipitated sediment is filtered and stirred with 5 cc. of acetone. After filtering, washing with acetone and drying in vacuum, the red colored powder is stirred with 1 cc. of water, filtered and washed with a small amount of water. The vitamins of the $B_{12}$ group are now found in the aqueous filtrate in practically pure form and in practically quantitative yield.

*Example 10*

100 cc. of the same concentrate as in Example 1 is brought to a pH of 7.0 and extracted four times with 100 cc. of a 15% solution of m-chlorophenol in o-dichlorobenzol. The combined extracts are washed twice, each time with 5 cc. of a 5% sodium bicarbonate solution, and subsequently three times, each time with 5 cc. of water. The thus obtained extract may be utilized with advantage for further purification and obtaining of crystallized vitamin $B_{12}$.

*Example 11*

100 cc. of the same concentrate as in Example 1 is brought to a pH of 6.5 and extracted four times, each time with 10 cc. of a 15% solution of 6-chloro-3-cresol in carbon tetrachloride. The combined extracts are washed twice, each time with 5 cc. of a 5% sodium bicarbonate solution and subsequently two times, each time with 5 cc. of water. In this manner there is obtained an extract which is suitable for further purification and obtaining of crystallized vitamin $B_{12}$.

Without further analysis, the foregoing will so fully reveal the gist of the present invention that others can by applying current knowledge readily adapt it for various applications without omitting features which, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process of producing vitamins of the $B_{12}$ group, the steps of treating a concentrate containing vitamins of the $B_{12}$ group with an organic solvent mixture comprising a mono-halogenated phenol selected from the group consisting of mono-halogenated phenols having the halogen group in the position meta and mono-halogenated phenols having the halogen group in the position para to the hydroxyl group of said phenol, dissolved in a liquid organic substance in which said vitamins of the $B_{12}$ group are insoluble and being selected from the group consisting of hydrocarbons, halogenated hydrocarbons and carbon disulfide, thereby forming an extract solution of said vitamin of the $B_{12}$ group dissolved in said solvent mixture; treating the thus-formed organic extract solution containing the vitamins of the $B_{12}$ group with water and with a water soluble alcohol, thereby causing due to said alcohol substantially quantitative transfer of said vitamins of the $B_{12}$ group into the aqueous phase; saturating the thus-obtained aqueous solution containing said vitamins of the $B_{12}$ group dissolved therein with a phenol selected from the group consisting of meta and para chlorophenol in the presence of an inert solid porous absorbent material, thereby forming a precipitate containing the oily water-insoluble complex of said vitamins of the $B_{12}$ group and said phenol absorbed on said absorbent; and recovering the thus-precipitated vitamins of the $B_{12}$ group.

2. In a process of producing vitamins of the $B_{12}$ group, the steps of treating a concentrate containing vitamins of the $B_{12}$ group with an organic solvent mixture comprising a mono-halogenated phenol selected from the group consisting of mono-halogenated phenols having the halogen group in the position meta and mono-halogenated phenols having the halogen group in the position para to the hydroxyl group of said phenol, dissolved in a liquid organic substance in which said vitamins of the $B_{12}$ group are insoluble and being selected from the group consisting of hydrocarbons, halogenated hydrocarbons and carbon disulfide, thereby forming an extract solution of said vitamins of the $B_{12}$ group dissolved in said solvent mixture; treating the thus-formed organic extract solution containing the vitamins of the $B_{12}$ group with water and with a water soluble alcohol in an amount sufficient only to cause precipitation of said vitamin $B_{12}$ group from said organic extract solution and thus cause dissolution of said vitamins of the $B_{12}$ group in said water, thereby causing due to said alcohol substantially quantitative transfer of said vitamins of the $B_{12}$ group into the aqueous phase; saturating the thus-obtained aqueous solution containing said vitamins of the $B_{12}$ group dissolved therein with a phenol selected from the group consisting of meta and para chlorophenol in the presence of an inert solid porous absorbent material, thereby forming a precipitate containing the oily water-insoluble complex of said vitamins of the $B_{12}$ group and said phenol absorbed on said absorbent; and recovering the thus-precipitated vitamins of the $B_{12}$ group.

3. In a process of producing vitamins of the $B_{12}$ group, the steps of treating a concentrate containing vitamins of the $B_{12}$ group with an organic solvent mixture comprising a mono-halogenated phenol selected from the group consisting of mono-halogenated phenols having the halogen group in the position meta and mono-halogenated phenols having the halogen group in the position para to the hydroxyl group of said phenol, dissolved in a liquid organic substance in which said vitamins of the $B_{12}$ group are insoluble and being selected from the group consisting of hydrocarbons, halogenated hydrocarbons and carbon disulfide, thereby forming an extract solution of said vitamins of the $B_{12}$ group dissolved in said solvent mixture; treating the thus-formed organic extract solution containing the vitamins of the $B_{12}$ group with water and with a water soluble alcohol, thereby causing due to said alcohol substantially quantitative transfer of said vitamins of the $B_{12}$ group into the aqueous phase; saturating the thus-obtained aqueous solution containing said vitamins of the $B_{12}$ group dissolved therein with a phenol selected from the group consisting of meta and para chlorophenol in the presence of an inert solid porous absorbent material, thereby forming a precipitate containing the oily water-insoluble complex of said vitamins of the $B_{12}$ group and said phenol absorbed by said inert solid porous absorbent material filtering said precipitate; washing the thus obtained filtered precipitate with a low molecular weight ketone so as to free said vitamins of the $B_{12}$ group from said phenol; and recovering the thus freed vitamins of the $B_{12}$ group.

References Cited in the file of this patent

UNITED STATES PATENTS

| | | |
|---|---|---|
| 2,530,416 | Wolf | Nov. 21, 1950 |
| 2,613,171 | Jackson | Oct. 7, 1952 |
| 2,643,968 | McCormick | June 30, 1953 |
| 2,678,900 | Denkewalter | May 18, 1954 |

FOREIGN PATENTS

| | | |
|---|---|---|
| 675,247 | Great Britain | July 9, 1952 |